Dec. 1, 1931. A. J. LAYHON 1,834,215
SHOCK ABSORBER
Filed Aug. 18, 1928
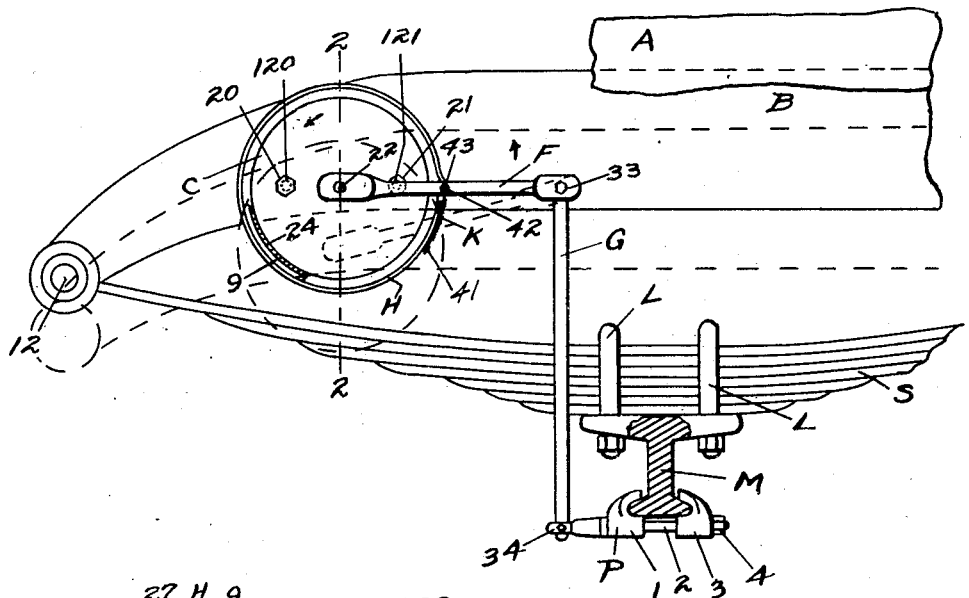
Fig. 1.
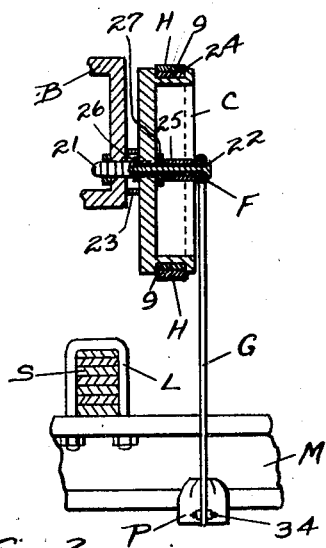
Fig. 2.
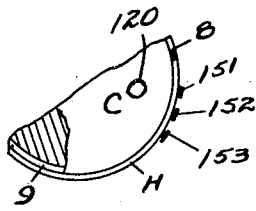
Fig. 3.
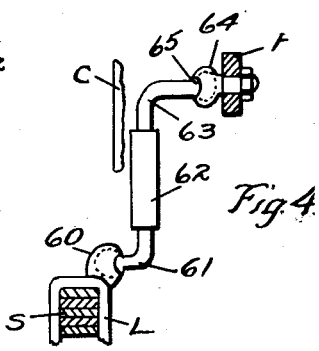
Fig. 4.
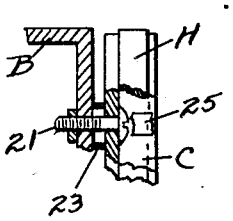
Fig. 6.
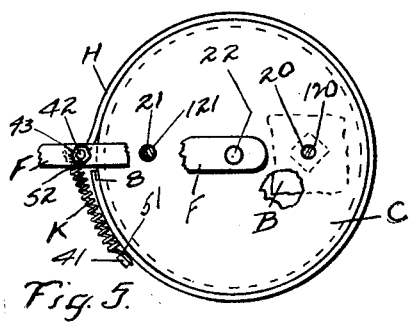
Fig. 5.
Fig. 7.
INVENTOR.
Arthur J. Layhon
BY
Gardner W. Pearson
ATTORNEY.

Patented Dec. 1, 1931

1,834,215

UNITED STATES PATENT OFFICE

ARTHUR J. LAYHON, OF LOWELL, MASSACHUSETTS

SHOCK ABSORBER

Application filed August 18, 1928. Serial No. 300,437.

This invention relates to shock absorbers or snubbers for automobiles.

The principle of its operation is based on the fact that where a brake band passes partly around a disc and has its ends connected by a spring, the band on the disc can move around in one direction where the tendency is to separate its ends much more easily than in the other direction where the tendency is to bring the ends together and tighten the band.

The particular advantages of my device over others for the same purpose are that it is very simple and inexpensive, can be easily attached and can readily be adjusted for different weights and types of cars and different strength of supporting springs for such cars.

In the drawings, Fig. 1 is a side elevation of my device in place.

Fig. 2 is a sectional elevation on line 2—2 of Fig. 1, viewed from the left.

Fig. 3 is an elevation detail showing a plurality of attaching heads.

Fig. 4 is an elevation similar to Fig. 2 showing a different type of connecting joints for the connecting rod.

Fig. 5 is an elevation of the device shown in Fig. 1, attached to the other side of the body.

Fig. 6 is a detail of a casing attaching bolt.

Fig. 7 is a detail of a removable brake band attaching bolt.

In the drawings, A represents the upper part of the body of an automobile supported upon a frame including the usual side supporting bars indicated by B.

M represents an axle which might be the front or the rear axle and is shown as of the usual I beam type.

By means of U-shaped clamping bolts indicated by L, the usual body supporting spring S is fastened to the axle and the end of this is shown as connected by the usual pivot joint 12 to the end of a side bar B.

C represents a detachable and reversible casing, which is shown as of disc shape and is attached to that part of the body represented by a side bar B by means of screws or bolts 20 and 21.

Preferably these bolts pass through holes 120 and 121 midway between the top and bottom of the annular channel 24 for band H in the periphery of casing C. Holes in this position allow the casing to be fastened on either side of the automobile.

At the center of said channel 24 is a pivot 22 for an operating arm F which extends from said pivot 22 out beyond said channel to a connecting rod G to which it is pivotally attached by a loose pivot shown as clevis joint 33.

H is a brake band positioned in channel 24 and preferably lined with a fireproof lining 9. Band H is attached at one end 40 to arm F and extends almost around channel 24. Near its end is a spring attaching head 41.

The end 40 of band H is preferably bent around a spring attaching bolt 42 which passes through arm F and is held in place by a nut 43. Preferably I stamp a hook 140 out of band end 40 and between this hook or other suitable device and head 41, I locate a tension spring K which has at one end a loop 52 which engages hook 140 and at its other end a loop 51 which hooks over the spring attaching head 41.

G is a connecting rod between the free end of arm F and a bracket P attached to the axle M, the pivotal connection therewith shown at 34 being of the same type as 33.

The jaws 1 and 3 on bolt 2 are clamped in place by nut 4.

As shown, casing C is kept away from frame B, by washers such as 23 on bolts 20 and 21, and nuts 26 and 27 hold pivot bolt 22 in place and bushing 25 in place thereon so that arm F freely pivots.

Preferably I use a plurality of adjustment heads such as 151, 152, 153, as shown in Fig. 3 for rapid adjustment of the tension spring. Such head or heads are preferably near but not at the free end 8 of the band H.

For the opposite side of the car, the casing is turned upside down, and the band removed and reversed to bring the spring on the down side as shown in Fig. 7.

Instead of a clevis or other pin joint, I may use ball and socket joints as shown in Fig. 4. Socket 60 is welded to a U bolt L and its ball is on a bent arm 61 threaded to enter a turn buckle connecting rod 62 which ends in a goose neck 63 which ends in a ball 65 in socket 64 fastened to arm F.

I claim:

1. The combination with an automobile having a body and supporting spring therefor fixed to an axle; of a casing fixed to the body and having an annular channel; an arm pivoted to said casing at the center of said casing and extending beyond the channel; a removable spring attaching bolt at a right angle from said arm; a band having one end looped around said bolt and having a spring attaching hook at that end, said band being positioned in and extending substantially around said channel and having near its free end a plurality of spring attaching heads; a tension spring having a loop at each end, one end engaging said hook and the other engaging a head; and a connecting rod pivoted at one end to the axle and at the other end to the free end of the arm.

2. The combination with an automobile having a body and a supporting spring therefor fixed to an axle; of a casing fixed to the body and having an annular channel; an arm pivoted to said casing at the center of said casing and extending beyond the channel; a band attached at one end to the arm, said band being in and extending substantially around said channel and having near its free end a spring attaching head and at its attached end, a spring attaching hook; a tension spring having a loop at each end, one end engaging said hook and the other engaging said head; and a connecting rod pivoted at one end to the axle and at the other end to the free end of the arm.

3. The combination with an automobile having a body and a supporting spring therefor fixed to an axle; of a casing detachably attached to the body by bolts positioned between the top and bottom of an annular channel in its periphery; an arm pivoted to said casing at the center of said casing and extending beyond the channel; a band removably attached at one end to the arm, said band being in and extending substantially around said channel and having near its free end a spring attaching head and at its attached end, a spring attaching hook, a tension spring having a loop at each end, one end engaging said hook and the other engaging said head; and a connecting rod pivoted at one end to the axle and at the other end to the free end of the arm.

4. The combination with an automobile having a body and a supporting spring therefor fixed to an axle; of a casing including a back detachably fastened to the body by means of bolts and including an annular rim which projects from the back, said rim having around its outer side an annular channel; an arm pivoted to said casing at the centre of said casing and extending outside of said rim; a removable spring attaching bolt at a right angle from said arm; a band having one end looped around said bolt and having a spring attaching hook at that end, said band being positioned in and extending substantially around said channel and having near its free end a plurality of spring attaching heads; a tension spring having a loop at each end, one end engaging said hook and the other engaging a head; and a connecting rod pivoted at one end to the axle and at the other end to the free end of the arm.

ARTHUR J. LAYHON.